United States Patent
Newberg

(10) Patent No.: US 11,422,141 B2
(45) Date of Patent: *Aug. 23, 2022

(54) SLIDE RACK CLAMP APPARATUS

(71) Applicant: LEICA BIOSYSTEMS IMAGING, INC., Vista, CA (US)

(72) Inventor: Nicholas Newberg, San Marcos, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/153,746

(22) Filed: Jan. 20, 2021

(65) Prior Publication Data

US 2021/0165008 A1 Jun. 3, 2021

Related U.S. Application Data

(63) Continuation of application No. 16/624,158, filed as application No. PCT/US2018/063464 on Nov. 30, 2018, now Pat. No. 10,928,408.

(Continued)

(51) Int. Cl.
   *G01N 35/10* (2006.01)
   *G01N 21/64* (2006.01)
   *G01N 35/00* (2006.01)

(52) U.S. Cl.
   CPC ......... *G01N 35/10* (2013.01); *G01N 21/6458* (2013.01); *G01N 35/00029* (2013.01);
   (Continued)

(58) Field of Classification Search
   CPC ............... G01N 35/10; G01N 21/6458; G01N 35/00029; G01N 2035/00138;
   (Continued)

(56) References Cited

U.S. PATENT DOCUMENTS 4,911,098 A 3/1990 Tabata
6,905,300 B1 * 6/2005 Russum ........... G01N 35/00029
406/86

(Continued)

FOREIGN PATENT DOCUMENTS

AU 2018374382 B2 3/2021
CN 111279201 A 6/2020
(Continued)

OTHER PUBLICATIONS

Extended European Search Report for EP 18882780.2 dated Feb. 2, 2021 in 6 pages.
(Continued)

*Primary Examiner* — David P Porta
*Assistant Examiner* — Meenakshi S Sahu
(74) *Attorney, Agent, or Firm* — Knobbe, Martens, Olson & Bear, LLP

(57) ABSTRACT

A slide rack clamp apparatus that secures a slide rack in a digital slide scanning apparatus. In an embodiment, the slide rack clamp apparatus includes an upper clamp and a lower clamp. Each clamp comprises one or more clamp projections, which are configured to engage one or more recesses in engagement surfaces of a plurality of different slide racks from different manufacturers. The lower clamp is driven by a motor along a linear axis to engage the lower clamp projections with the one or more slide rack recesses of the bottom surface of the slide rack. The motor drives the lower clamp and the engaged slide rack upward to engage the one or more slide rack recesses of the top surface of the slide rack with the clamp projections of the upper clamp to fully engage the slide rack between the upper clamp and the lower clamp.

19 Claims, 10 Drawing Sheets

Related U.S. Application Data

(60) Provisional application No. 62/593,138, filed on Nov. 30, 2017.

(52) U.S. Cl.
CPC .............. *G01N 2035/00138* (2013.01); *G01N 2201/10* (2013.01)

(58) Field of Classification Search
CPC ..... G01N 2201/10; G01N 2035/00089; G01N 2035/0412; G01N 35/04; B01L 2300/0822; B01L 9/52
See application file for complete search history.

(56) References Cited

U.S. PATENT DOCUMENTS

| | | | |
|---|---|---|---|
| 7,327,515 | B2 | 2/2008 | Virag et al. |
| 7,426,345 | B2 | 9/2008 | Takamatsu et al. |
| 7,468,161 | B2 | 12/2008 | Reinhardt et al. |
| 8,048,373 | B2 | 11/2011 | Reinhardt et al. |
| 8,158,061 | B2 | 4/2012 | Shah et al. |
| 10,928,408 | B2 * | 2/2021 | Newberg ................. B01L 9/52 |
| 2002/0076351 | A1 | 6/2002 | Wernz et al. |
| 2006/0228107 | A1 * | 10/2006 | Takamatsu ........... G02B 21/367 |
| | | | 396/432 |
| 2012/0189412 | A1 | 7/2012 | Hoffmann et al. |

FOREIGN PATENT DOCUMENTS

| | | |
|---|---|---|
| DE | 10-2011-009502 A1 | 7/2012 |
| JP | 6869434 B2 | 5/2021 |
| WO | WO 2006/098442 A1 | 9/2006 |
| WO | WO 2019/109031 A1 | 6/2019 |

OTHER PUBLICATIONS

International Search Report and Written Opinion dated Feb. 8, 2019 for App No. PCT/US2018/063464, in 6 pages.

* cited by examiner

SLIDE RACK CLAMP APPARATUS

CROSS-REFERENCE TO RELATED APPLICATIONS

This application is a continuation of U.S. patent application Ser. No. 16/624,158, filed on Dec. 18, 2019, which is a national stage entry of International Patent App. No. PCT/US2018/063464, filed on Nov. 30, 2018, which claims priority to U.S. Provisional Patent App. No. 62/593,138, filed on Nov. 30, 2017, which are all hereby incorporated herein by reference as if set forth in full.

BACKGROUND

Field of the Invention

The present invention relates generally to a digital slide scanning apparatus (e.g., for pathology) and, more particularly, to an internal slide rack clamp apparatus that secures a slide rack for internal transport within the digital slide scanning apparatus.

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology has exploded and is currently regarded as one of the most promising avenues of diagnostic medicine in order to achieve even better, faster, and cheaper diagnosis, prognosis, and prediction of important diseases, such as cancer.

Some digital slide scanning apparatuses have been modified to hold a plurality of slide racks so that the digital slide scanning apparatus can sequentially process tens or hundreds of glass slides without interruption. However, the conveyance of individual glass slides from the slide rack to the scanning stage remains a significant challenge. Therefore, what is needed is a system and method that overcomes these significant problems found in the conventional systems described above.

SUMMARY

Accordingly, in an embodiment, a slide rack clamp apparatus is described herein that secures a slide rack, internal to a digital slide scanning apparatus, for conveyance to and from a scanning stage within the digital slide scanning apparatus. The slide rack clamp apparatus may include an upper clamp and a lower clamp. Each of the upper clamp and the lower clamp include one or more clamp projections. The one or more clamp projections may be configured to engage one or more slide rack recesses of a plurality of different slide racks from a plurality of different slide rack manufacturers. The lower clamp is driven by a motor along a linear axis to engage the lower clamp projections with the one or more slide rack recesses of the lower surface of the slide rack. The motor drives the lower clamp and the engaged slide rack upward to engage the one or more slide rack recesses of the upper surface of the slide rack with the clamp projections of the upper clamp, so as to fully engage the slide rack between the upper clamp and the lower clamp.

In an embodiment, a slide rack clamp apparatus comprises: a lower clamp comprising an engagement surface and two or more lower clamp projections extending outward from the engagement surface, the lower clamp projections configured to engage one or more slide rack recesses in a bottom surface of a slide rack; an upper clamp comprising an engagement surface and two or more upper clamp projections extending outward from the engagement surface, the upper clamp projections configured to engage one or more slide rack recesses in a top surface of the slide rack; and a motor configured to drive the lower clamp along a linear axis to engage the lower clamp projections with the one or more slide rack recesses in the bottom surface of the slide rack, and, subsequent to engaging the lower clamp with the slide rack, drive the lower clamp farther along the linear axis to engage the one or more slide rack recesses in the top surface of the slide rack with the upper clamp projections so as to fully engage the slide rack between the lower clamp and the upper clamp. The two or more clamp projections of the lower clamp and/or upper clamp may extend a fixed distance from the engagement surface of the respective clamp. At least one (e.g., all) of the two or more projections of the lower clamp and/or upper clamp is spring-loaded, such that it remains extended when engaged with one of the one or more slide rack recesses in the respective surface of the slide rack, and recedes into a recess of the engagement surface of the respective clamp when directly engaged with the respective surface of the slide rack.

In an embodiment, the upper clamp is configured to provide resistance against the motor, while the motor is driving the lower clamp along the linear axis, when the slide rack is fully engaged between the lower clamp and the upper clamp. The resistance may comprise the weight of the upper clamp.

In an embodiment, the lower clamp projections and/or upper clamp projections are configured to prevent X-Y movement of the slide rack, in a plane that is orthogonal to a longitudinal axis of the clamp projections, when engaged with the one or more slide rack recesses in the respective surface of the slide rack. Each of the two or more lower clamp projections may correspond to an identical one of the two or more upper clamp projections. In addition, each of the two or more lower clamp projections may be aligned, along a longitudinal axis of the lower clamp projection, with the identical one of the two or more upper clamp projections.

In an embodiment, each of the two or more lower clamp projections and each of the two or more upper clamp projections comprise a beveled edge and/or are positionally fixed with respect to the engagement surface of their respective clamps. A profile of the two or more lower clamp projections and a profile of the two or more upper clamp projections may be aligned with two or more different profiles of recesses for two or more different slide racks, such that each of the two or more lower clamp projections and the two or more upper clamp projections fit within at least one recess in each of the two or more different slide racks.

In an embodiment, a digital slide scanning apparatus comprises: the slide rack clamp apparatus of claim 1; and an assembly for loading a slide from the slide rack onto a scanning stage and unloading a slide from the scanning stage into the slide rack.

In an embodiment, a method is disclosed that comprises: controlling a motor to drive a lower clamp, comprising an engagement surface and two or more lower clamp projections extending outward from the engagement surface, toward a bottom surface of a slide rack; engaging the two or more lower clamp projections with one or more slide rack recesses in the bottom surface of the slide rack; subsequent to engaging the two or more lower clamp projections with the one or more slide rack recesses in the bottom surface of the slide rack, controlling the motor to drive the lower clamp and the slide rack toward an upper clamp, comprising a slide rack engagement surface and two or more upper clamp projections extending outward from the engagement surface; engaging one or more slide rack recesses in the top surface of the slide rack with the two or more upper clamp projections to fully engage the slide rack between the lower clamp and the upper clamp; and controlling the motor to drive the fully engaged slide rack toward a scanning stage within a digital slide scanning apparatus. Controlling the motor to drive the lower clamp may comprise driving the lower clamp along a linear axis.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a slide rack clamp apparatus that engages a lower and upper surface of a slide rack from a plurality of manufacturers, and secures the slide rack and the glass slides therein for internal transport within a digital slide scanning apparatus. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

1. Example Slide Racks

Figure 1A:
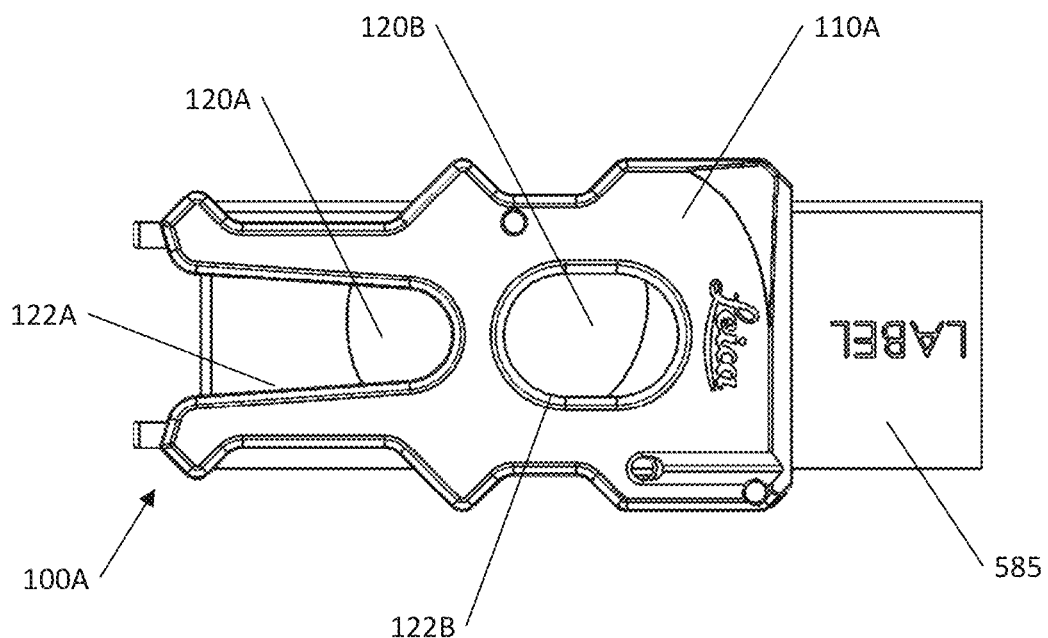
FIG. 1A is a top-view diagram illustrating an example slide rack from a first manufacturer with glass slides, according to an embodiment.

FIG. 1A is a top-view diagram illustrating an example slide rack 100A from a first manufacturer with glass slides 585, according to an embodiment. In the illustrated embodiment, the slide rack 100A comprises two slide rack recesses 120A and 120B in the top surface 110A of the slide rack 100A. Additionally, the top surface 110A of the slide rack 100A comprises a bevel along one or more of the internal and/or external edges of the top surface 110A of the slide rack 100A. Specifically, the recesses 120A and 120B are each formed with a beveled internal edge 122A and 122B, respectively. The external edges of the top surface 110A are also shown with a bevel. In alternative embodiments, different portions of the internal and/or external edges of the top surface 110A of the slide rack 100A may be beveled (e.g., transitioning from the top surface 110A to side surfaces of the slide rack 100A at a slope) and/or unbeveled (e.g., transitioning from the top surface 110A to side surfaces of the slide rack 100A at a right angle).

Figure 1B:
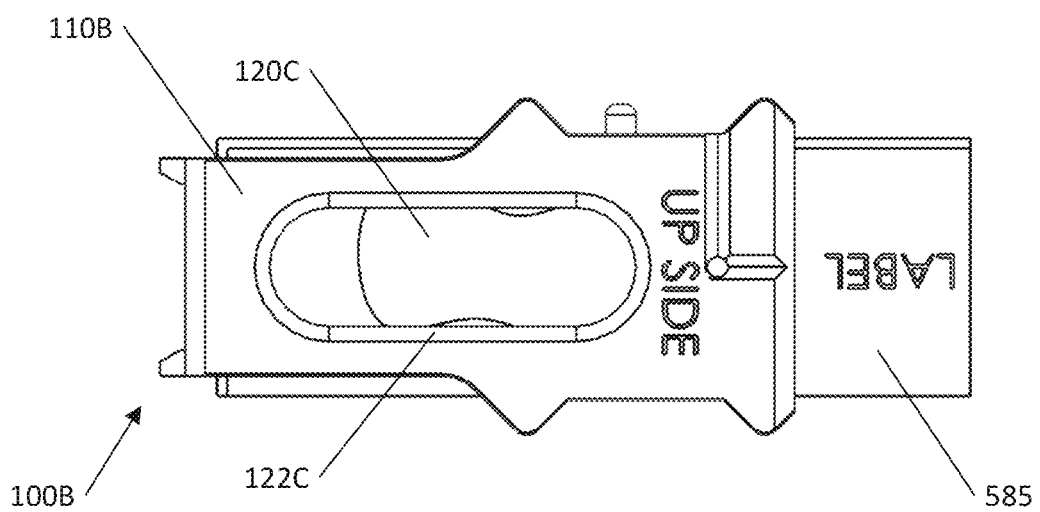
FIG. 1B is a top-view diagram illustrating an example slide rack from a second manufacturer with glass slides, according to an embodiment.

FIG. 1B is a top-view diagram illustrating an example slide rack 100B from a second manufacturer with glass slides 585, according to an embodiment. In the illustrated embodiment, the slide rack 100B comprises a single slide rack recess 120C in the top surface 110B of the slide rack 100B. Additionally, the top surface 110B of the slide rack 100B comprises a bevel along one or more of the internal and/or external edges of the top surface 110B of the slide rack 100B. Specifically, the recess 120C is formed with a beveled internal edge 122C. However, the external edge of the top surface 110B is shown as unbeveled. In alternative embodiments, different portions of the internal and/or external edges of the top surface 110B of the slide rack 100B may be beveled and/or unbeveled.

Although not shown, the bottom surfaces of the slide racks 100A and 100B may be similar or identical to the respective top surfaces 110A and 110B. For example, the bottom surface of the slide rack 100A may comprise the same recesses 120A and 120B, as well as the same beveled edges 122A and 122B. Similarly, the bottom surface of the slide rack 100B may comprise the same recess 120C, as well as the same beveled edge 122C.

2. Example Slide Rack Clamp Apparatus

Figure 2A:
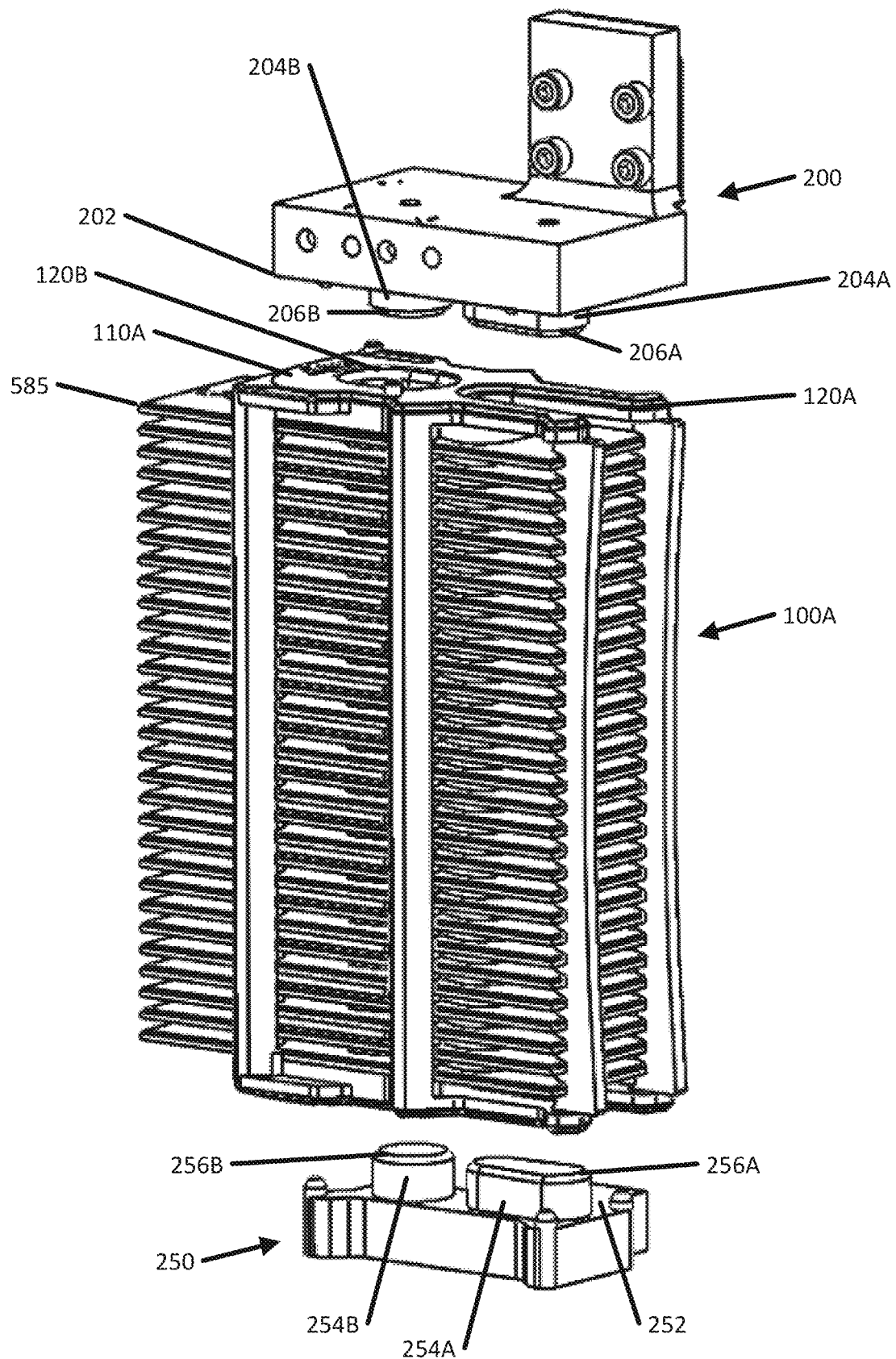
FIG. 2A is a perspective-view diagram illustrating a slide rack clamp apparatus with an example slide rack from a first manufacturer, according to an embodiment.
Figure 2B:
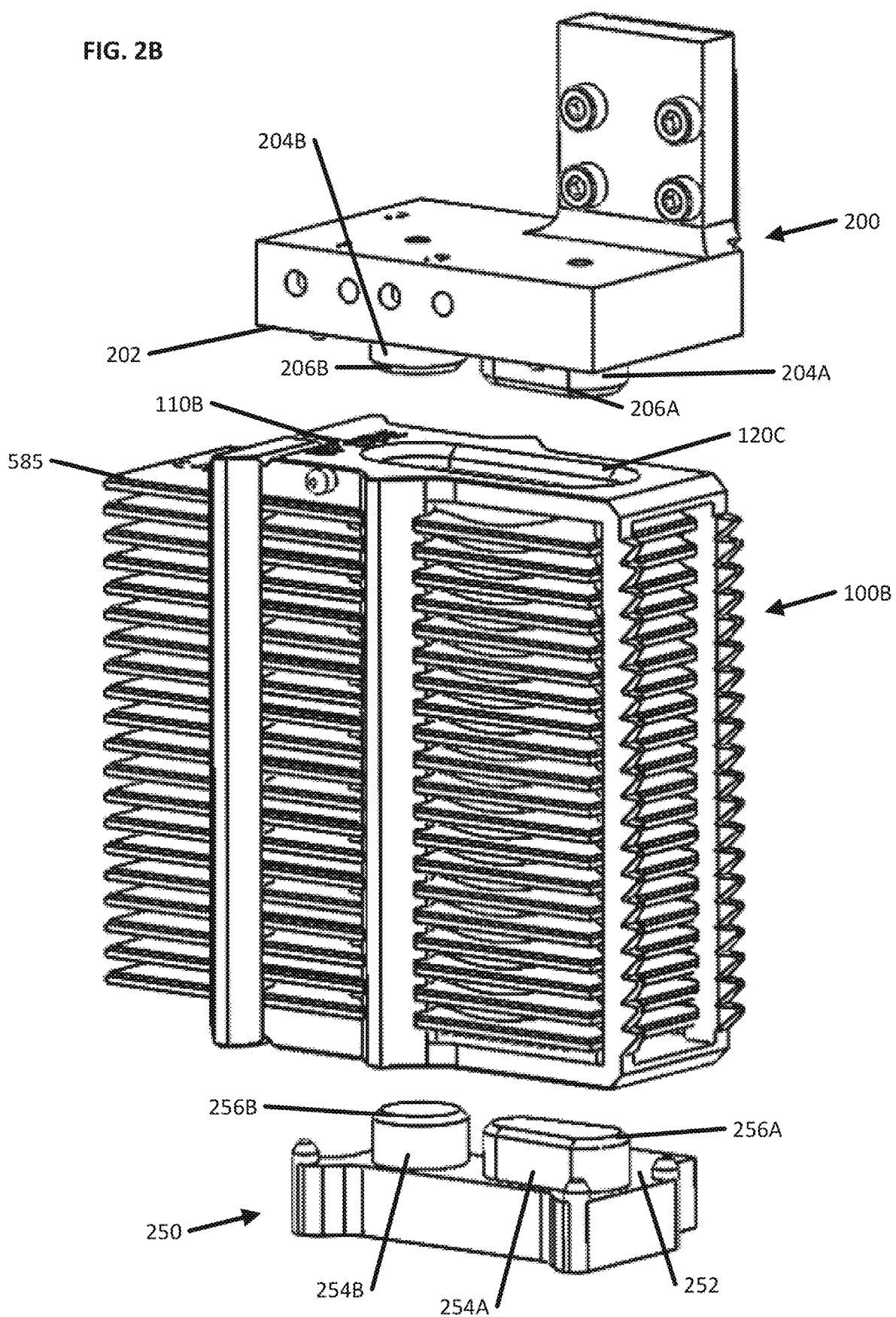
FIG. 2B is a perspective-view diagram illustrating a slide rack clamp apparatus with an example slide rack from a second manufacturer, according to an embodiment.

FIG. 2A is a perspective-view diagram illustrating a slide rack clamp apparatus with an example slide rack 100A from a first manufacturer, according to an embodiment. FIG. 2B is a perspective-view diagram illustrating the same slide rack clamp apparatus with an example slide rack 100B from a second manufacturer, according to an embodiment. In the illustrated embodiment, the slide rack clamp apparatus comprises an upper clamp 200 and a lower clamp 250.

In an embodiment, the upper clamp 200 comprises an engagement surface 202 (not visible in FIGS. 2A and 2B due to the orientation of the upper clamp 200) configured to engage at least one engagement surface of the slide rack 100 (e.g., the top surface 110). Similarly, the lower clamp 250 comprises an engagement surface 252 configured to engage at least one engagement surface of the slide rack 100 (e.g., the bottom surface of slide rack 100). Each of the engagement surface 202 of the upper clamp 200 and the engagement surface 252 of the lower clamp 250 has a plurality of projections extending outward from the respective engagement surface. For example, in the illustrated embodiment, the engagement surface 202 of the upper clamp 200 has a plurality of downwardly extending projections 204. Similarly, the engagement surface 252 of the lower clamp 250 has a plurality of upwardly extending projections 254. The plurality of projections on either engagement surface of the slide rack clamp apparatus may be the same or different in shape and/or size, and the plurality of projections on the engagement surface of one clamp may be the same or different in number, shape, and/or size than the plurality of projections on the engagement surface of the other clamp. In the illustrated example, the upper clamp 200 has two projections 204A and 204B, which are different shapes and sizes from each other, and the lower clamp 250 has two projections 254A and 254B, which are different shapes and sizes from each other. However, the projection 204A on the upper clamp 200 is identical to the projection 254A on the lower clamp 250, and the projection 204B on the upper clamp 200 is identical to the projection 254B on the lower clamp 250. In other words, the plurality of projections on the same engagement surface are different from each other, but the set of projections on one engagement surface are the same as the set of projections on the other engagement surface. As shown, each pair of identical projections may be aligned with each other (i.e., mirror each other) along the longitudinal axis between the upper clamp 200 and the lower clamp 250.

In an embodiment, one or more edges of the projections 204 and 254 are beveled. For example, in the illustrated embodiment, the projections 204A and 204B of the upper clamp 200 have beveled edges 206A and 206B, respectively. Similarly, the projections 254A and 254B of the lower clamp 250 have beveled edges 256A and 256B, respectively. Advantageously, the beveled edges 206 of the projections 204 may facilitate alignment of the upper clamp 200 with the top surface 110 of the slide rack 100 when the upper clamp 200 engages the slide rack 100, and the beveled edges 256 of the projections 254 may facilitate alignment of the lower clamp 250 with the bottom surface of the slide rack 100 when the lower clamp 250 engages the slide rack 100.

In an embodiment, the one or more beveled edges of the projections mirror the recess(es) in the corresponding engagement surfaces of one or more slide racks 100, which may or may not also have beveled edges. For example, in the illustrated embodiment, the beveled edge 206A of the projection 204A of the upper clamp 200 mirrors the internal beveled edges 122A of recess 120A and 122C of recess 120C in the top surfaces 110 of both slide racks 100A and 100B, respectively, and the beveled edge 206B of the projection 204B of the upper clamp 200 mirrors the internal beveled edges 122B of recess 120B and 122C of recess 120C in the top surfaces 110 of both slide racks 100A and 100B, respectively. Similarly, the beveled edge 256A of the projection 254A of the lower clamp 250 mirrors the internal beveled edges 122A of recess 120A and 122C of recess 120C in the bottom surfaces of both slide racks 100A and 100B, respectively, and the beveled edge 256B of the projection 254B of the lower clamp 250 mirrors the internal beveled edges 122B of recess 120B and 122C of recess 120C in the bottom surfaces of both slide rack 100A and 100B, respectively. In an alternative embodiment, one or more beveled edges of the projections do not mirror the corresponding engagement surfaces of the slide rack 100.

Figure 2C:
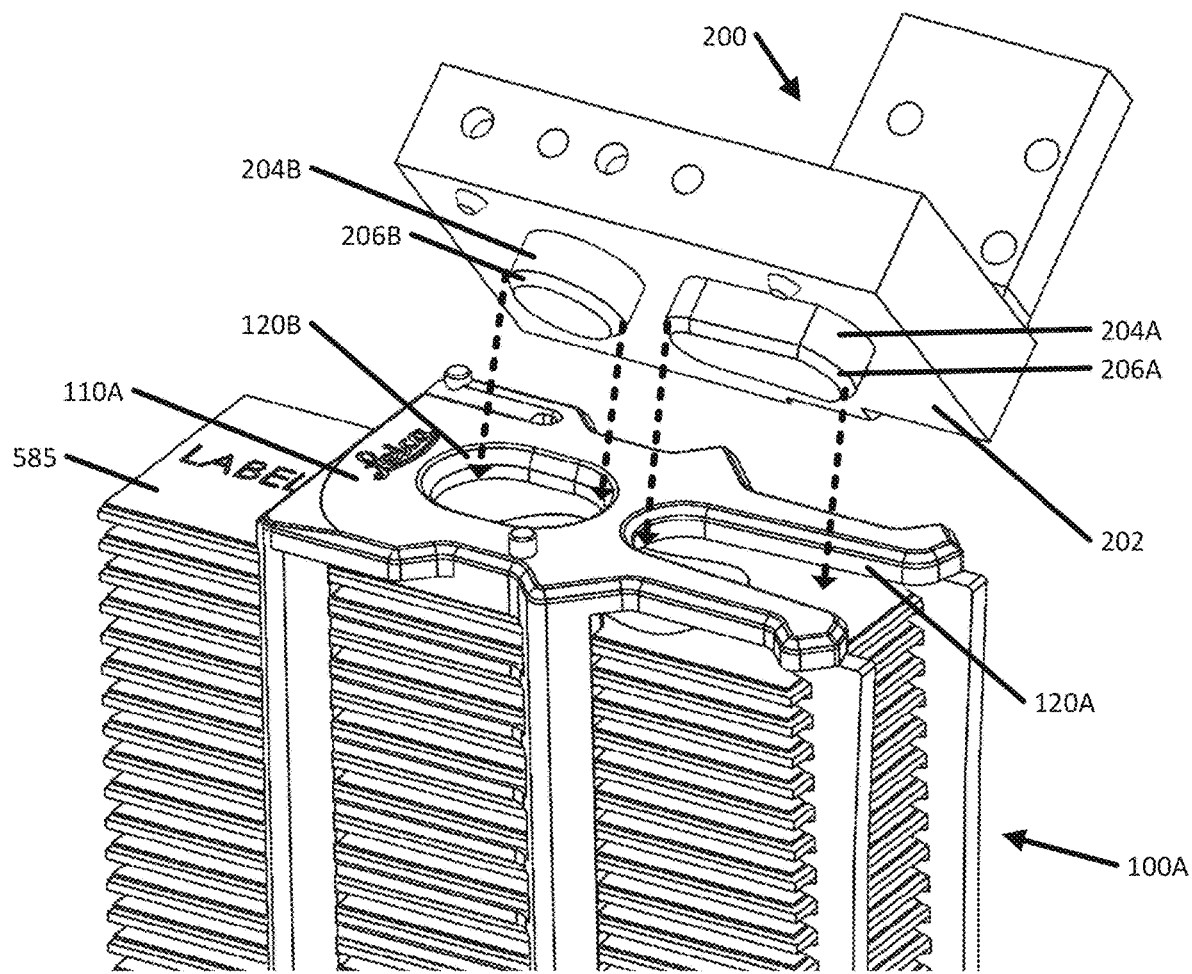
FIG. 2C is a perspective-view diagram illustrating the engagement positions of the projections of an upper clamp with respect to a slide rack from a first manufacturer, according to an embodiment.

FIG. 2C is a perspective-view diagram illustrating the engagement positions of the projections 204 of the upper clamp 200 with respect to a slide rack 100A from a first manufacturer, according to an embodiment. In the illustrated embodiment, the plurality of projections 204 on the engagement surface 202 of the upper clamp 200 are configured to engage the two slide rack recesses 120A and 120B of the first slide rack 100A by fitting within recesses 120A and 120B. Specifically, projection 204A fits within recess 120A in the top surface 110A of the slide rack 100A, and projection 204B fits within the recess 120B in the top surface 110A of the slide rack 100A. Although not shown, the projections 254A and 254B of the lower clamp 250 fit within recesses 120A and 120B on the bottom surface of the slide rack 100A, in an identical manner.

Figure 2D:
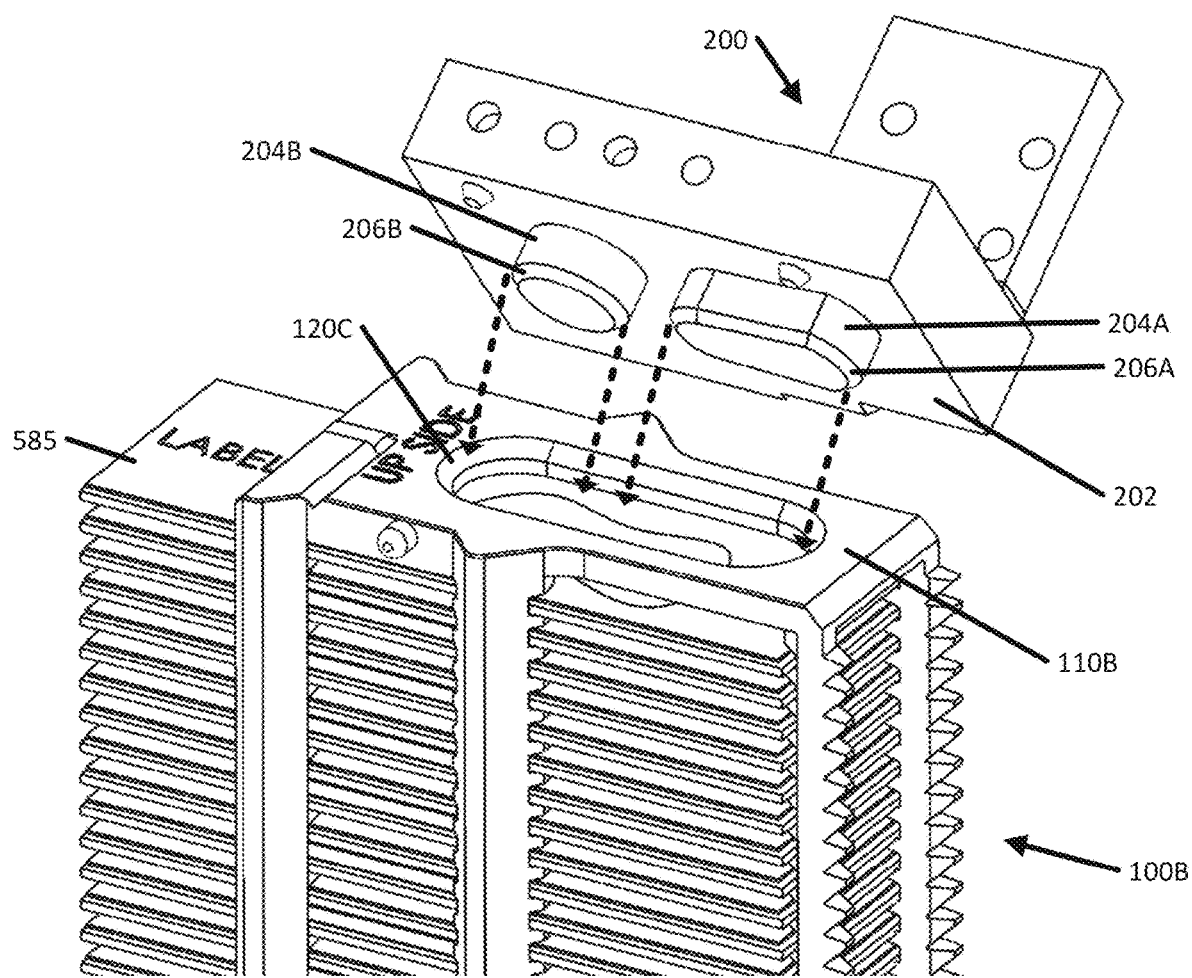
FIG. 2D is a perspective-view diagram illustrating the engagement positions of the projections of an upper clamp with respect to a slide rack from a second manufacturer, according to an embodiment of the invention.

FIG. 2D is a perspective-view diagram illustrating the engagement positions of the projections 204 of the upper clamp 200 with respect to a slide rack 100B from a second manufacturer, according to an embodiment. In the illustrated embodiment, the plurality of projections 204 on the engagement surface 202 of the upper clamp 200 are configured to engage the single slide rack recess 120C of the second slide rack 100B by fitting within recess 120C. Specifically, projection 204A fits within a first region of the recess 120C in the top surface 110B of the slide rack 100B, and projection 204B fits within a second region of the same recess 120C in the top surface 110B of the slide rack 100B. Although not shown, the projections 254A and 254B of the lower clamp 250 fit within recess 120C on the bottom surface of the slide rack 100B, in an identical manner.

As illustrated, the upper clamp 200 and lower clamp 250 are configured to be usable with (i.e., support engagement with) two or more different slide racks 100A and 100B. This is achieved by configuring the profile of the plurality of projections 204 and 254, such that the cross-section of each projection 204 and 254 (i.e., within a cut plane that is orthogonal to the longitudinal axis of the projections) fits within a recess 120 in the top and/or bottom engagement surfaces of each slide rack 100 that is to be supported by the slide rack clamp apparatus. In this manner, the slide rack clamp apparatus can be configured to support any number of slide racks 100 (e.g., two, three, five, ten, twenty, fifty, one hundred, etc.).

In the illustrated embodiment, the plurality of projections 204 and 254 are fixed such that they do not move. Advantageously, engagement of the projections 204 and 254 with the slide rack recess(es) 120 in the top surface 110 and bottom surface of each slide rack 100, prevents X-Y movement of the slide rack 100. Specifically, insertion of the projections 204 and 254 within recess(es) 120 of the top and bottom surfaces prevent the slide rack 100 from sliding or shifting within a plane that is orthogonal to the longitudinal axis of the projections 204 and 254.

In an alternative embodiment, one or more projections 204 and/or 254, on one or both of the upper clamp 200 and lower clamp 250, may be configured to move. For example, a projection may slide along its longitudinal axis, such that it recedes into a recess of its respective clamp when force is applied to the open end of the projection. The projection may be biased towards extending from (as opposed to receding into) the engagement surface 202 or 252. This bias may be accomplished using a spring, within the recess in the clamp into which the projection is configured to recede, to push, along the longitudinal axis of the projection, on the closed end of the projection that is opposite the open end of the projection (e.g., which engages the slide rack 100). When a force is applied to the open end of the projection, the spring compresses, such that the projection recedes into the clamp, and, when the force is removed, the spring decompresses, thereby pushing the projection out of the recess in the clamp so as to extend from the clamp. In this manner, if the projection does not fit within any recess 120 of the engagement surface of the slide rack 100, the force of the direct engagement with the engagement surface of the slide rack 100 will push the projection into its recess in the clamp, so that the projection is out of the way. Any projections which do fit within a recess 120 of the engagement surface of the slide rack 100 do not recede into the clamp, and therefore, will extend into the recess 120 so as to prevent X-Y movement of the slide rack 100. An advantage of using one or more movable projections is that the profile of the plurality of projections 204 and 254 does not have to correspond to the profile of the recesses 120 in each of the slide racks 100 to be supported, since projections which do not fit within a recess 120 of the engagement surface of the slide rack 100 are forced into their corresponding recesses in the clamp so as to be out of the way. A disadvantage of using movable projections, as opposed to fixed projections, is the addition of mechanical complexity (e.g., springs and recesses within the clamp). It should be understood that, in an embodiment, some projections may be fixed (e.g., a projection which corresponds to a recess 120 in every supported slide rack 100), while others may be movable (e.g., a projection which corresponds to a recess 120 in only a partial subset of the supported slide racks 100).

Figure 3A:
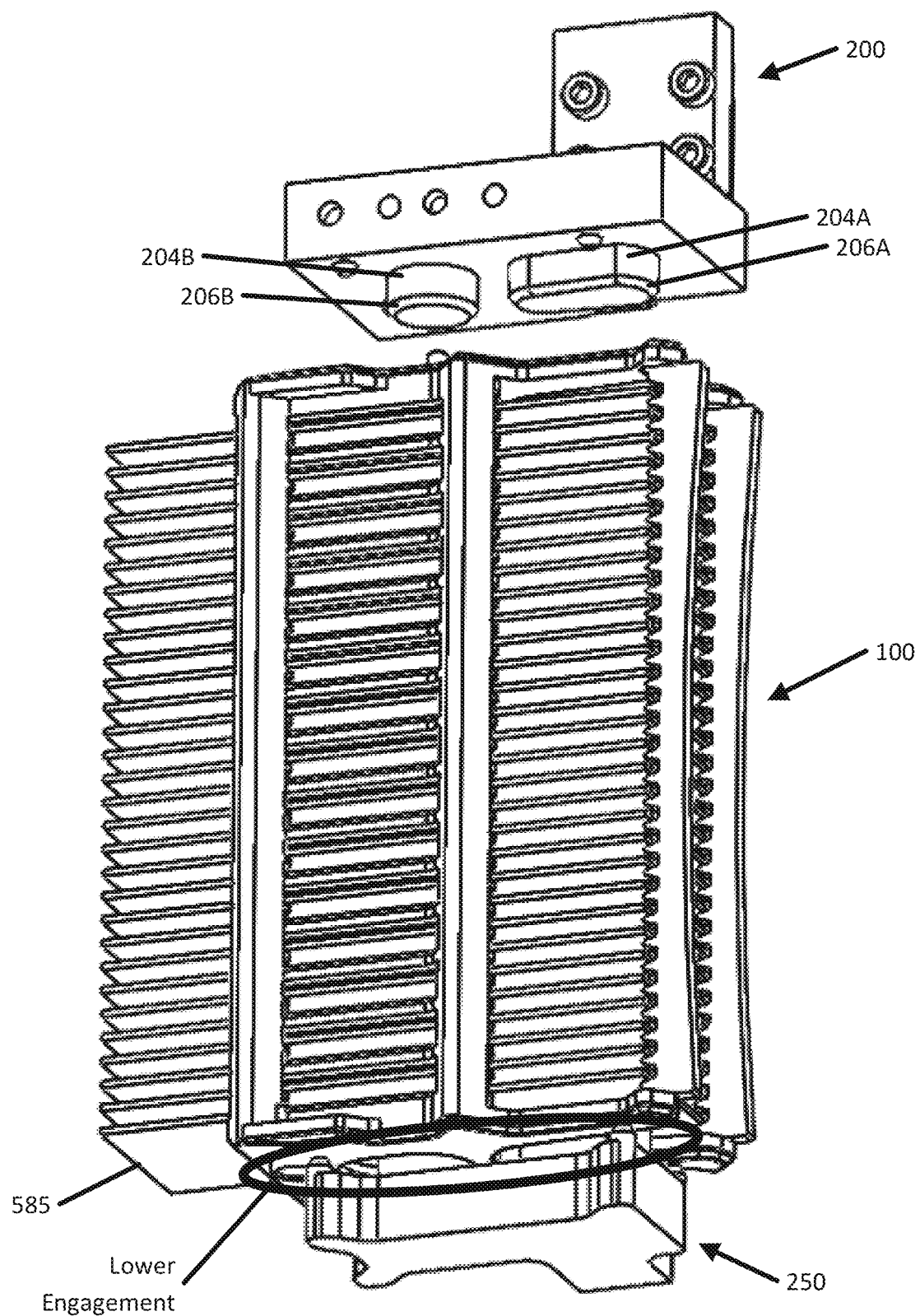
FIG. 3A is a perspective-view diagram illustrating partial engagement of a slide rack, according to an embodiment.

FIG. 3A is a perspective-view diagram illustrating partial engagement of a slide rack 100, according to an embodiment. Specifically, in an initial state, the slide rack 100 is engaged with the lower clamp 250, but not yet engaged with the upper clamp 200. In an embodiment, a motor (not shown) is configured to drive the lower clamp 250 along a linear axis (e.g., that is parallel to the longitudinal axis of the projections 254 and orthogonal to the plane of the engagement surface 252) to engage the projections 254 of the lower clamp 250 with the one or more slide rack recesses 120 in the bottom surface of the slide rack 100. The upper clamp 200 is positioned along the same linear axis, and the projections 204 are aligned with the projections 254 within the linear axis. Thus, as the motor drives the lower clamp 250 along the linear axis, while the lower clamp 250 is engaged with the slide rack 100, the top surface 110 of the slide rack 100 is brought into engagement with the upper clamp 200. In an embodiment, the motor may drive the lower clamp 250 along the linear axis until it detects resistance from the engagement surface 202 of the upper clamp 200 (e.g., produced by the weight of the upper clamp 200 against the top surface 110 of the slide rack 100).

Figure 3B:
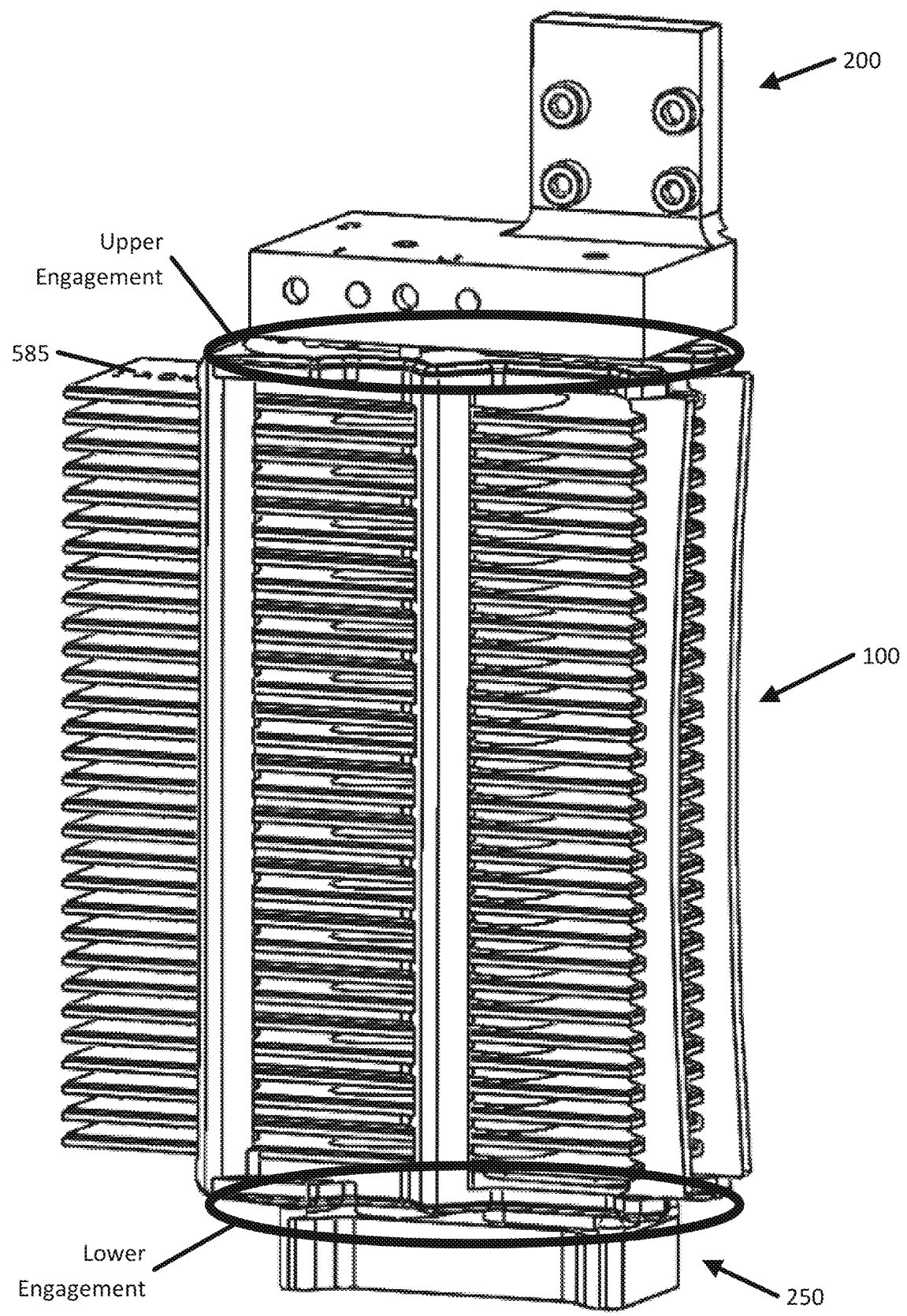
FIG. 3B is a perspective-view diagram illustrating full engagement of a slide rack, according to an embodiment.

FIG. 3B is a perspective-view diagram illustrating full engagement of a slide rack 100, according to an embodiment. Specifically, the slide rack 100 is engaged with both the lower clamp 250 and the upper clamp 200. In the illustrated embodiment, following the initial, partial engagement between the lower clamp 250 and the slide rack 100 illustrated in FIG. 3A, the motor has driven the lower clamp 250, as well as the slide rack 100 due to the partial engagement, to additionally engage the upper clamp 200. Accordingly, the slide rack 100 is now fully engaged between the upper clamp 200 and the lower clamp 250. In addition, the slide rack 100 is prevented from X-Y-Z movement with respect to the slide rack clamp apparatus, because the slide rack 100 is fixed, along all three axes, between the upper clamp 200 and the lower clamp 250 by virtue of the projections 204 and 254. The same motor and/or a different motor may be configured to drive the slide rack clamp apparatus, in this fully engaged state, so as to move the slide rack 100 to a scanning stage of the digital slide scanning apparatus.

While the lower clamp 250 is described as being driven towards the upper clamp 200, it should be understood that, in an alternative embodiment, the upper clamp 200 could initially engage with the slide rack 100 and then drive the slide rack 100 along the linear axis to engage with the lower clamp 250. As another alternative, the slide rack 100 can be positioned on the lower clamp 250 (e.g., by a slide rack carousel, operator, etc.) so as to initially engage with the lower clamp 250 without the need of the motor, and then the motor could drive the upper clamp 200 along the linear axis to engage with the top surface 110 of the slide rack 100. As yet another alternative, the slide rack 100 can be positioned to initially engage with the upper clamp 200 without the need of the motor, and then the motor could drive the lower clamp 250 along the linear axis to engage with the bottom surface of the slide rack 100. Other manners and sequences of initial and full engagement are also contemplated.

Figure 3C:
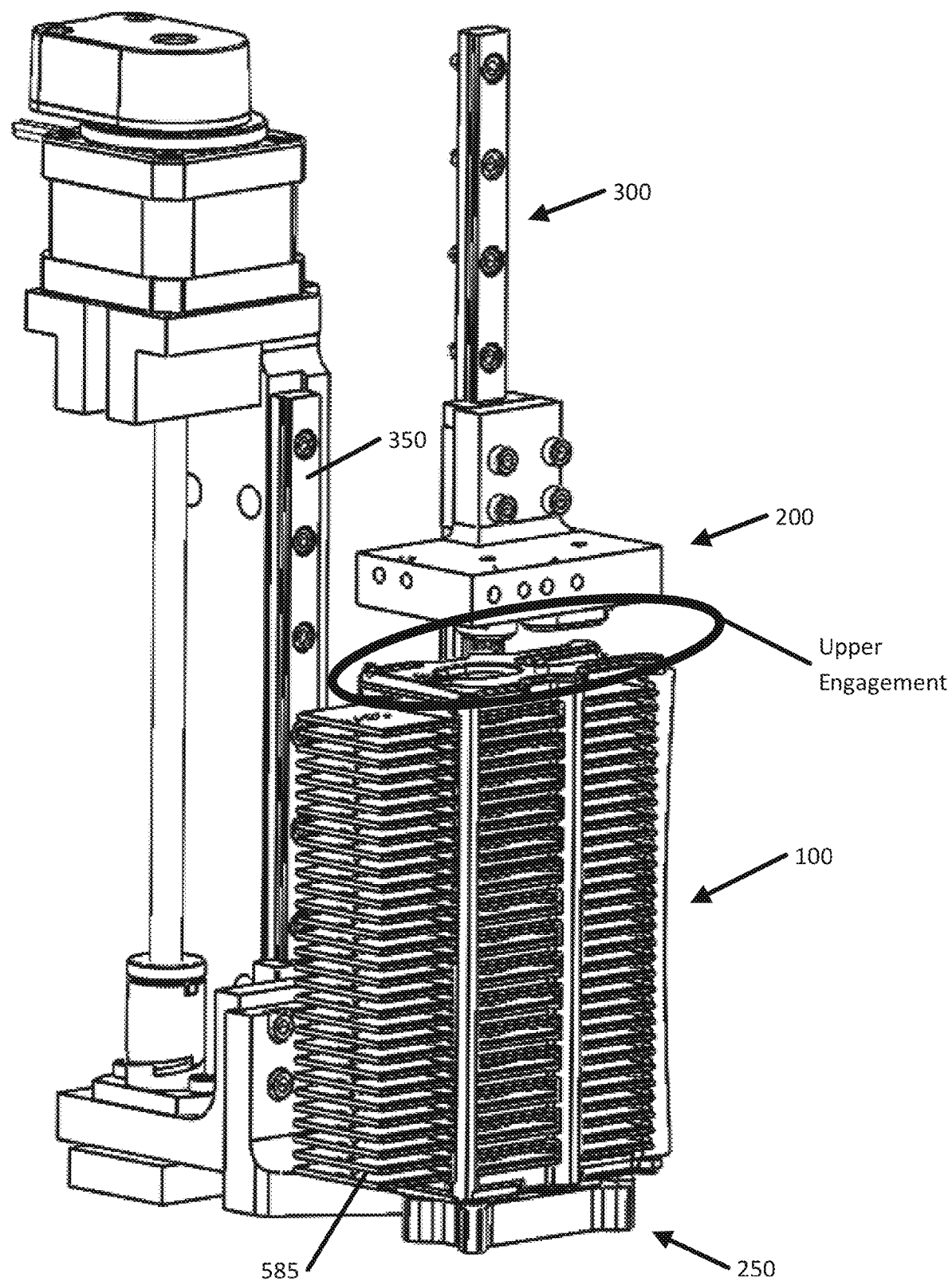
FIG. 3C is a perspective-view diagram illustrating partial engagement of a slide rack, according to an embodiment.

FIG. 3C is a perspective-view diagram illustrating partial engagement of a slide rack 100, according to an embodiment. Specifically, in an initial state, the slide rack 100 is engaged with the lower clamp 250, but not yet engaged with the upper clamp 200. In an embodiment, a motor (not shown) is configured to drive the lower clamp 250 along a linear axis (e.g., that is parallel to the longitudinal axis of the projections 254 and orthogonal to the plane of the engagement surface 252) guided by a linear axis rail 350 to engage the projections 254 of the lower clamp 250 with the one or more slide rack recesses 120 in the bottom surface of the slide rack 100. The upper clamp 200 is guided by a linear axis rail 300 and is positioned along the same linear axis as the lower clamp 250, and the projections 204 are aligned with the projections 254 within the linear axis. Thus, as the motor drives the lower clamp 250 along the linear axis rail 350 to drive the lower clamp 250 along the linear axis, while the lower clamp 250 is engaged with the slide rack 100, the top surface 110 of the slide rack 100 is brought into engagement with the upper clamp 200. In an embodiment, the motor may drive the lower clamp 250 along the linear axis rail 350 to drive the lower clamp 250 along the linear axis until it detects resistance from the engagement surface 202 of the upper clamp 200 (e.g., produced by the weight of the upper clamp 200 against the top surface 110 of the slide rack 100).

Figure 3D:
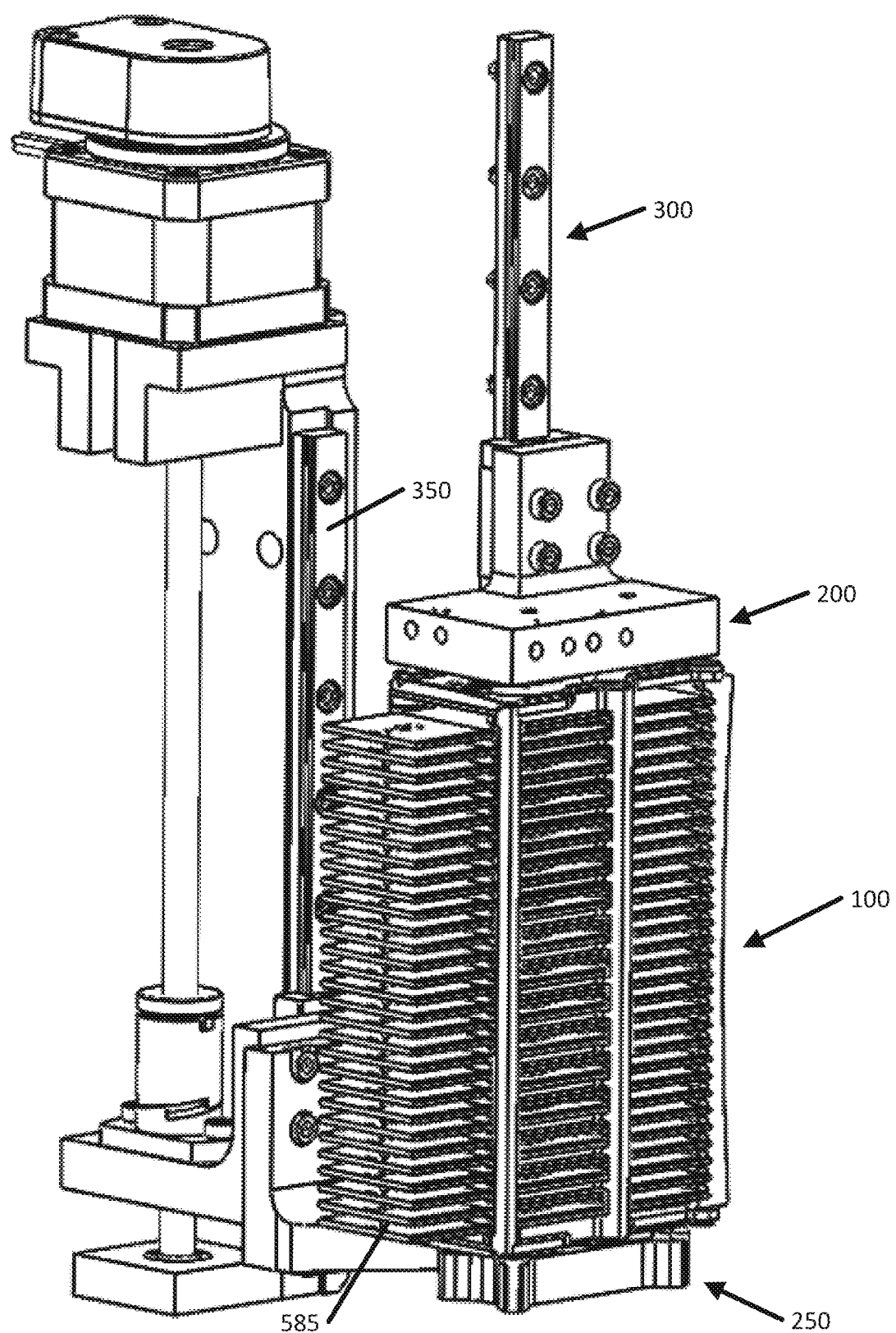
FIG. 3D is a perspective-view diagram illustrating full engagement of a slide rack, according to an embodiment.

FIG. 3D is a perspective-view diagram illustrating full engagement of a slide rack 100, according to an embodiment. Specifically, the slide rack 100 is engaged with both the lower clamp 250 and the upper clamp 200. In the illustrated embodiment, following the initial, partial engagement between the lower clamp 250 and the slide rack 100 illustrated in FIG. 3C, the motor has driven the lower clamp 250, as well as the slide rack 100 due to the partial engagement, to additionally engage the upper clamp 200. Accordingly, the slide rack 100 is now fully engaged between the upper clamp 200 and the lower clamp 250. In addition, the slide rack 100 is prevented from X-Y-Z movement with respect to the slide rack clamp apparatus, because the slide rack 100 is fixed, along all three axes, between the upper clamp 200 and the lower clamp 250 by virtue of the projections 204 and 254. The same motor and/or a different motor may be configured to drive the slide rack clamp apparatus along the respective linear axis rails 300 and 350 in this fully engaged state, so as to move the slide rack 100 along the linear axis to a scanning stage of the digital slide scanning apparatus.

While the lower clamp 250 is described as being driven towards the upper clamp 200, it should be understood that, in an alternative embodiment, the upper clamp 200 could initially engage with the slide rack 100 and then drive the slide rack 100 along the respective linear axis rails 300 and 350 to move the slide rack 100 along the linear axis to engage with the lower clamp 250. As another alternative, the slide rack 100 can be positioned on the lower clamp 250 (e.g., by a slide rack carousel, operator, etc.) so as to initially engage with the lower clamp 250 without the need of the motor, and then the motor could drive the upper clamp 200 along the linear axis rail 300 to engage with the top surface 110 of the slide rack 100. As yet another alternative, the slide rack 100 can be positioned to initially engage with the upper clamp 200 without the need of the motor, and then the motor could drive the lower clamp 250 along the linear axis rail 300 to engage with the bottom surface of the slide rack 100. Other manners and sequences of initial and full engagement are also contemplated.

3. Example Embodiments

In an embodiment, a slide rack clamp apparatus includes a lower clamp having a slide rack engagement surface and two or more lower clamp projections extending upward from the slide rack engagement surface. The lower clamp projections are configured to engage one or more slide rack recesses in a bottom surface of a slide rack. The slide rack clamp apparatus also includes an upper clamp having a slide rack engagement surface and two or more upper clamp projections extending downward from the slide rack engagement surface. The upper clamp projections are configured to engage one or more slide rack recesses in a top surface of a slide rack. The slide rack clamp apparatus also includes a first motor configured to drive the lower clamp along a linear axis to engage the lower clamp projections with the one or more slide rack recesses in the bottom surface of the slide rack. The first motor is also configured to, subsequent to engaging the lower clamp with the slide rack, drive the lower clamp along the linear axis to engage the upper clamp projections with the one or more slide rack recesses in the top surface of the slide rack to fully engage the slide rack between the lower clamp and the upper clamp.

In an embodiment, the two or more lower clamp projections of the slide rack clamp apparatus are fixed to the lower clamp slide rack engagement surface and extend a fixed distance from the lower clamp slide rack engagement surface.

In an embodiment, the two or more lower clamp projections of the slide rack clamp apparatus are not fixed and are configured to remain extended into the one or more slide rack recesses in the bottom surface of the slide rack or recede into the lower clamp slide rack engagement surface when engaged with the bottom surface of the slide rack. For example, the two or more lower clamp projections may be spring-loaded.

In an embodiment, the two or more upper clamp projections of the slide rack clamp apparatus are fixed to the upper clamp slide rack engagement surface and extend a fixed distance from the upper clamp slide rack engagement surface.

In an embodiment, the two or more upper clamp projections of the slide rack clamp apparatus are not fixed and are configured to remain extended into the one or more slide rack recesses in the top surface of the slide rack or recede into the upper clamp slide rack engagement surface when engaged with the top surface of the slide rack. For example, the two or more upper clamp projections may be spring-loaded.

In an embodiment, the upper clamp is configured to provide resistance against the first motor driving the lower clamp along the linear axis when the slide rack is fully engaged between the lower clamp and the upper clamp. For example, the resistance may be provided by the weight of the upper clamp. The resistance may also be mechanical or magnetic in alternative embodiments. Advantageously, the resistance secures the slide rack between the upper and lower clamps during transport.

In an embodiment, the lower clamp projections are further configured to prevent X-Y movement of the slide rack when engaged with the one or more slide rack recesses in the bottom surface of the slide rack.

In an embodiment, the upper clamp projections are further configured to prevent X-Y movement of the slide rack when engaged with the one or more slide rack recesses in the top surface of the slide rack.

In an embodiment, a method of securing a slide rack within a digital slide scanner apparatus comprises using a motor to drive a lower clamp, having a slide rack engagement surface and two or more lower clamp projections extending upward from the slide rack engagement surface, toward a bottom surface of a slide rack and engaging the two or more lower clamp projections with one or more slide rack recesses in the bottom surface of the slide rack. The method also includes, subsequent to engaging the two or more lower clamp projections with one or more slide rack recesses in the bottom surface of the slide rack, using the motor to drive the lower clamp and the slide rack toward an upper clamp, having a slide rack engagement surface and two or more upper clamp projections extending downward from the slide rack engagement surface, and engaging the two or more upper clamp projections with one or more slide rack recesses in the top surface of the slide rack. The method also includes using the motor to drive the fully engaged slide rack toward a scanning stage within the digital slide scanner apparatus. In an embodiment of the method, using the motor to drive the lower clamp includes driving the lower clamp along a linear axis.

4. Example Digital Slide Scanning Apparatus

Figure 4A:
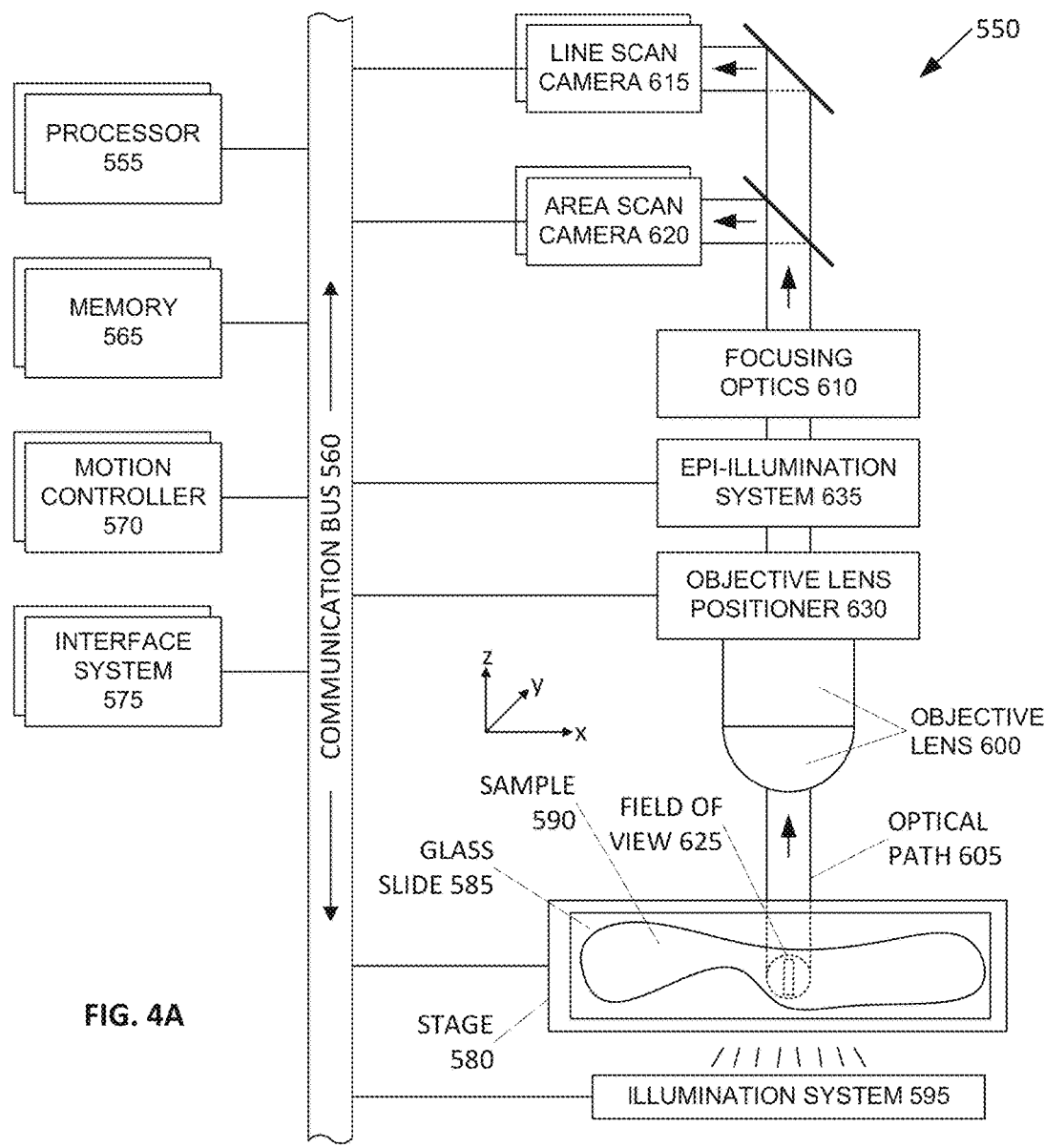
FIG. 4A is a block diagram illustrating an example processor-enabled device that may be used in connection with various embodiments described herein.

FIG. 4A is a block diagram illustrating an example processor-enabled device 550 that may be used in connection with various embodiments described herein. Alternative forms of the device 550 may also be used as will be understood by the skilled artisan. In the illustrated embodiment, the device 550 is presented as a digital imaging device (also referred to as a digital slide scanning apparatus, digital slide scanner, scanner, scanner system, digital imaging device, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description, these elements will be described in the singular except when needed to be described in the plural to convey the appropriate information.

The one or more processors 555 may include, for example, a central processing unit (CPU) and a separate graphics processing unit (GPU) capable of processing instructions in parallel, or the one or more processors 555 may include a multi-core processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital-signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555. The one or more processors may be configured to control the motors of the clamp apparatus, and thereby control the overall workflow of the digital imaging device 550.

The memory 565 provides storage of data and instructions for programs that can be executed by the processor 555. The memory 565 may include one or more volatile and/or non-volatile computer-readable storage mediums that store the data and instructions, including, for example, a random access memory, a read only memory, a hard disk drive, a removable storage drive, and/or the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate X-Y-Z movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium, etc.) or external devices, such as an image server system, an operator station, a user station, and an administrative server system, that are connected to the scanner system 550 via a network (not shown).

The illumination system 595 is configured to illuminate a portion of the sample 590. The illumination system 595 may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In an embodiment, the illumination system 595 illuminates the sample 590 in transmission mode such that the line scan camera 615 and/or area scan camera 620 sense optical energy that is transmitted through the sample 590. Alternatively or additionally, the illumination system 595 may be configured to illuminate the sample 590 in reflection mode such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration (TDI) line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10-bit 64-linear-array TDI line scan camera. It should be noted that a variety of bit depths for the line scan camera 615 can be employed for use with a fluorescence scanner embodiment of the scanning system 550.

The movable stage 580 is configured for precise X-Y axes movement under control of the processor 555 or the motion controller 570. The movable stage may also be configured for movement in a Z axis under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. In an embodiment, the scanner system 550 may employ a high-precision and tightly coordinated X-Y grid to aid in the location of the sample 590 on the movable stage 580. In an embodiment, the movable stage 580 is a linear motor based X-Y stage with high precision encoders employed on both the X and the Y axes. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA, RNA, or protein that is deposited on any type of slide or other substrate, including any and all samples commonly known as microarrays. The sample 590 may be a microtiter plate, for example a 96-well plate. Other examples of the sample 590 include integrated circuit boards, electrophoresis records, petri dishes, film, semiconductor materials, forensic materials, and machined parts.

Objective lens 600 is mounted on the objective positioner 630 which, in an embodiment, may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in X-Y-Z axes are coordinated and controlled in a closed loop manner using motion controller 570 under the control of the processor 555 that employs memory 565 for storing information and instructions, including the computer-executable programmed steps for overall operation of the scanning system 550.

In an embodiment, the objective lens 600 is a plan apochromatic ("APO") infinity-corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40X, 0.75NA or 20X, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, and/or the like. The objective lens 600 combined with focusing optics 610 provides the total magnification for the scanning system 550. In an embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a 3-linear-array ("red-green-blue" or "RGB") color line scan camera or a 96-linear-array monochrome TDI may also be used. TDI line scan cameras typically provide a substantially better signal-to-noise ratio (SNR) in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1,024 pixels, and others having as many as 4,096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615, so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555, and the processed contiguous digital image can also be stored in the memory 565.

In an embodiment with two or more line scan cameras 615, at least one of the line scan cameras 615 can be configured to function as a focusing sensor that operates in combination with at least one of the line scan cameras 615 that is configured to function as an imaging sensor. The focusing sensor can be logically positioned on the same optical axis as the imaging sensor, or the focusing sensor may be logically positioned before or after the imaging sensor with respect to the scanning direction of the scanner system 550. In an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in an embodiment, the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data (e.g., an adjacent stripe). Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image stripe. A plurality of adjacent image stripes are similarly combined together to form a contiguous digital image of a portion of the sample 590 or the entire sample 590. The scanning of the sample 590 may include acquiring vertical image stripes or horizontal image stripes. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image stripes be acquired in an adjacent or contiguous manner. Furthermore, the resulting image of the sample 590 may be an image of the entire sample 590 or only a portion of the sample 590.

In an embodiment, computer-executable instructions (e.g., programmed modules or other software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly (e.g., via a network).

Figure 4B:
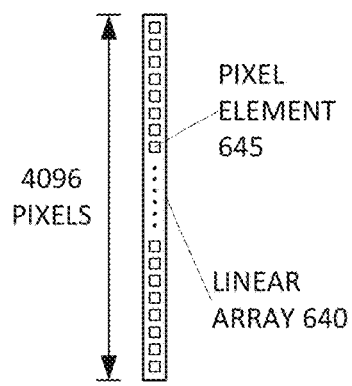
FIG. 4B is a block diagram illustrating an example line scan camera having a single linear array, according to an embodiment.

FIG. 4B illustrates a line scan camera having a single linear array 640, which may be implemented as a charge coupled device ("CCD") array. The single linear array 640 comprises a plurality of individual pixels 645. In the illustrated embodiment, the single linear array 640 has 4,096 pixels. In alternative embodiments, linear array 640 may have more or fewer pixels. For example, common formats of linear arrays include 512, 1,024, and 4,096 pixels. The pixels 645 are arranged in a linear fashion to define a field of view 625 for the linear array 640. The size of the field of view varies in accordance with the magnification of the scanner system 550.

Figure 4C:
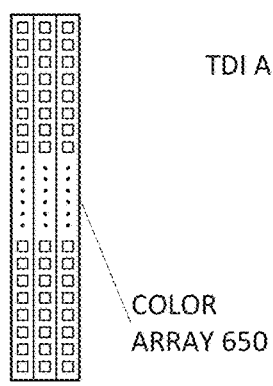
FIG. 4C is a block diagram illustrating an example line scan camera having three linear arrays, according to an embodiment.

FIG. 4C illustrates a line scan camera having three linear arrays, each of which may be implemented as a CCD array. The three linear arrays combine to form a color array 650. In an embodiment, each individual linear array in the color array 650 detects a different color intensity (e.g., red, green, or blue). The color image data from each individual linear array in the color array 650 is combined to form a single field of view 625 of color image data.

Figure 4D:
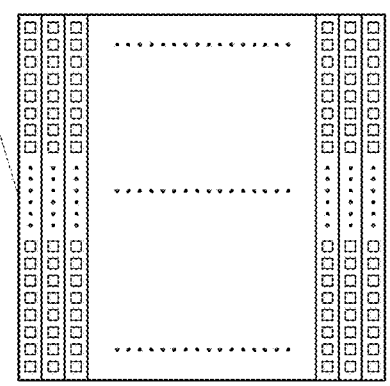
FIG. 4D is a block diagram illustrating an example line scan camera having a plurality of linear arrays, according to an embodiment.

FIG. 4D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square root of the number of linear arrays (also referred to as integration stages). A TDI line scan camera may comprise a larger variety of numbers of linear arrays. For example, common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A slide rack clamp apparatus comprising:
   a first clamp comprising a first engagement surface and one or more first clamp projections extending outward from the first engagement surface, the one or more first clamp projections configured to engage one or more slide rack recesses in a first surface of a slide rack;
   a second clamp comprising a second engagement surface and one or more second clamp projections extending outward from the second engagement surface, the one or more second clamp projections configured to engage one or more slide rack recesses in a second surface of the slide rack; and
   a motor configured to drive one or both of the first clamp and the second clamp along a linear axis to engage the one or more first clamp projections with the one or more slide rack recesses in the first surface of the slide rack and engage the one or more second clamp projections with the one or more slide rack recesses in the second surface of the slide rack.

2. The slide rack clamp apparatus of claim 1, wherein the one or more first clamp projections extend a fixed distance from the first engagement surface of the first clamp.

3. The slide rack clamp apparatus of claim 1, wherein the one or more second clamp projections extend a fixed distance from the second engagement surface of the second clamp.

4. The slide rack clamp apparatus of claim 1, wherein at least one of the one or more first clamp projections is spring-loaded, such that the at least one first clamp projection remains extended when engaged with one of the one or more slide rack recesses in the first surface of the slide rack, and recedes into a recess of the first engagement surface of the first clamp when directly engaged with the first surface of the slide rack.

5. The slide rack clamp apparatus of claim 4, wherein the one or more first clamp projections comprise a plurality of first clamp projections that are each spring-loaded.

6. The slide rack clamp apparatus of claim 1, wherein at least one of the one or more second clamp projections is spring-loaded, such that the at least one second clamp projection remains extended when engaged with one of the one or more slide rack recesses in the second surface of the slide rack, and recedes into a recess of the second engagement surface of the second clamp when directly engaged with the second surface of the slide rack.

7. The slide rack clamp apparatus of claim 6, wherein the one or more second clamp projections comprise a plurality of second clamp projections that are each spring-loaded.

8. The slide rack clamp apparatus of claim 1, wherein the motor is configured to drive the first clamp along the linear axis, and wherein the second clamp is configured to provide resistance against the motor, while the motor is driving the first clamp along the linear axis, when the slide rack is fully engaged between the first clamp and the second clamp.

9. The slide rack clamp apparatus of claim 8, wherein the resistance comprises a weight of the second clamp.

10. The slide rack clamp apparatus of claim 1, wherein the one or more first clamp projections are configured to prevent X-Y movement of the slide rack, in a plane that is orthogonal to a longitudinal axis of the one or more first clamp projections, when engaged with the one or more slide rack recesses in the first surface of the slide rack.

11. The slide rack clamp apparatus of claim 1, wherein the one or more second clamp projections are configured to prevent X-Y movement of the slide rack, in a plane that is orthogonal to a longitudinal axis of the one or more second clamp projections, when engaged with the one or more slide rack recesses in the second surface of the slide rack.

12. The slide rack clamp apparatus of claim 1, wherein each of the one or more first clamp projections corresponds to an identical one of the one or more second clamp projections.

13. The slide rack clamp apparatus of claim 12, wherein each of the one or more first clamp projections is aligned, along a longitudinal axis of the first clamp projection, with the identical one of the one or more second clamp projections.

14. The slide rack clamp apparatus of claim 1, wherein each of the one or more first clamp projections and each of the one or more second clamp projections comprises a beveled edge.

15. The slide rack clamp apparatus of claim 1, wherein the one or more first clamp projections and the one or more second clamp projections are positionally fixed.

16. The slide rack clamp apparatus of claim 15, wherein a profile of the one or more first clamp projections and a profile of the one or more second clamp projections are aligned with two or more different profiles of recesses for two or more different slide racks, such that each of the one or more first clamp projections and the one or more second clamp projections fits within at least one recess in each of the two or more different slide racks.

17. A digital slide scanning apparatus comprising:
the slide rack clamp apparatus of claim 1;
and an assembly for loading a slide from the slide rack onto a scanning stage and unloading a slide from the scanning stage into the slide rack.

18. A method comprising:
controlling a motor to drive a first clamp, comprising a first engagement surface and one or more first clamp projections extending outward from the first engagement surface, toward a first surface of a slide rack;
engaging the one or more first clamp projections with one or more slide rack recesses in the first surface of the slide rack;
subsequent to engaging the one or more first clamp projections with the one or more slide rack recesses in the first surface of the slide rack, controlling the motor to drive the first clamp and the slide rack toward a second clamp, comprising a second engagement surface and one or more second clamp projections extending outward from the second engagement surface;
engaging one or more slide rack recesses in the second surface of the slide rack with the one or more second clamp projections to fully engage the slide rack between the first clamp and the second clamp; and
controlling the motor to drive the fully engaged slide rack toward a scanning stage within a digital slide scanning apparatus.

19. The method of claim 18, wherein controlling the motor to drive the first clamp comprises driving the first clamp along a linear axis.

* * * * *